United States Patent [19]

Clark et al.

[11] Patent Number: 5,102,642

[45] Date of Patent: Apr. 7, 1992

[54] CRYSTALLINE ALUMINOPHOSPHATE COMPOSITIONS

[75] Inventors: David M. Clark, Waterloo, England; Ronald J. Dogterom; Bettina Kraushaar-Czarnetzki, both of Amsterdam, Netherlands

[73] Assignee: Shell Oil Company, Houston, Tex.

[21] Appl. No.: 677,712

[22] Filed: Mar. 29, 1991

Related U.S. Application Data

[63] Continuation-in-part of Ser. No. 523,515, May 15, 1990, abandoned.

[30] Foreign Application Priority Data

Oct. 27, 1989 [GB] United Kingdom ............... 8924262

[51] Int. Cl.$^5$ .............................. C01B 33/34
[52] U.S. Cl. .................... 423/328; 502/208; 502/214
[58] Field of Search .............. 423/305, 306, 328; 502/208, 214

[56] References Cited

U.S. PATENT DOCUMENTS

| | | | |
|---|---|---|---|
| 3,013,986 | 12/1961 | Castor | 252/455 |
| 4,310,440 | 1/1982 | Wilson et al. | 252/435 |
| 4,590,050 | 5/1986 | Chang et al. | 423/305 |
| 4,623,527 | 11/1986 | Derouane et al. | 423/306 |
| 4,642,226 | 2/1987 | Calvert et al. | 423/328 |
| 4,672,049 | 6/1987 | Chen et al. | 502/66 |
| 4,756,822 | 7/1988 | Chen et al. | 208/111 |
| 4,793,984 | 12/1988 | Lok et al. | 423/306 |

FOREIGN PATENT DOCUMENTS 0159846 10/1985 European Pat. Off.
0159847 10/1985 European Pat. Off.
0164939 12/1985 European Pat. Off.

*Primary Examiner*—R. Bruce Breneman

[57] ABSTRACT

Crystalline aluminophosphates and related compounds having in the as-synthesized anhydrous form the chemical composition $mR(X_nAl_qP_x)O_2$, wherein R represents 1,4-diaminobutane as defined hereinbefore, X represents one or more elements which can be substituted for Al and/or P, wherein $m = 0-0.33$
$n = 0-0.40$
$q = 0.30-0.60$
$x = 0.30-0.60$ and wherein $n+q+x=1$ and having an X-ray diffraction pattern containing at least the lines as given in Table A, B, C, D, E or F.

The compounds can be prepared from a forming solution or gel comprising a source of alumina, a source of phosphorus, 1,4-diaminobutane and optionally a source of at least one component X wherein the various sources are present in certain specified molar ratios, by keeping the solution or gel at elevated temperature for a time sufficient to produce crystalline aluminophosphates or related compounds.

5 Claims, No Drawings

CRYSTALLINE ALUMINOPHOSPHATE COMPOSITIONS

This application is a continuation-in-part of application Ser. No. 07/523,515, filed May 15, 1990, now abandoned.

FIELD OF THE INVENTION

The present invention relates to novel crystalline alumino-phosphate compositions and a process for preparing such aluminophosphates.

BACKGROUND OF THE INVENTION

Crystalline aluminophosphate compositions are well known materials which find a promising reception in industry as new generations of molecular sieves, catalyst carriers as well as catalysts. For instance, in U.S. Pat. No. 4,310,440 the preparation of various crystalline aluminophosphates is described from reaction mixtures containing inter alia organic structure directing or templating agents including tetrapropyl-ammonium hydroxide, quinuclidine, t-butylamine and ethylenediamine.

Classes of these materials comprise compositions crystallised in the $AlPO_4$, $SAPO_4$ (siliconaluminophosphate), $MeAPO_4$ (metalloaluminophosphate) and $ElAPO_4$ (non-metal substituted aluminophosphate) families.

It has now been found that novel crystalline aluminophosphates and related compounds, e.g. of the $AlPO_4$-, $SAPO_4$- and $MeAPO_4$-type can be prepared from reaction gels or solutions when use is made of the appropriate forming components and a certain organic diamine.

SUMMARY OF THE INVENTION

The present invention relates to crystalline aluminophosphates and related compounds having in the as-synthesized anhydrous form the chemical composition: $mR(X_nAl_qP_x)O_2$, wherein R represents a 1,4-diaminobutane as defined hereinbelow, X represents one or more elements which can be substituted for Al and/or P, wherein m = 0–0.33
n = 0–0.40
q = 0.30–0.60
x = 0.30–0.60 and wherein n+q+x=1, and having an X-ray diffraction pattern containing at least the lines as given in Table A, B, C, D, E or F. In all Tables the interplanar spacing, d, is expressed in Angstrom. The relative intensity of the lines of the X-ray diffraction pattern is expressed as vs, very strong; s, strong; m, medium; w, weak; and vw, very weak.

TABLE A

| d (A) | Intensity |
|---|---|
| 11.0–11.4 | vw–m |
| 9.0–9.4 | m–vs |
| 7.0–7.3 | vw–m |
| 4.7–4.9 | vw–m |
| 4.40–4.51 | vw–vs |
| 4.20–4.31 | vw–s |
| 3.80–3.90 | vw–vs |
| 3.53–3.59 | vw–m |
| 3.46–3.52 | vw–m |
| 3.09–3.15 | vw–m |
| 2.76–2.80 | vw–m |

TABLE B

| d (A) | Intensity |
|---|---|
| 12.0–12.4 | w–m |
| 10.9–11.4 | s–vs |
| 9.0–9.4 | s–vs |
| 4.4–4.6 | w |
| 4.41–4.51 | w |
| 3.69–3.79 | w |
| 3.52–3.58 | w |
| 3.43–3.50 | w |

TABLE C

| d (A) | Intensity |
|---|---|
| 9.6–10.2 | m–vs |
| 6.6–6.8 | w–s |
| 4.41–4.52 | w–vs |
| 3.81–3.91 | w–s |
| 3.56–3.63 | m–s |
| 3.45–3.51 | w–vs |
| 2.78–2.84 | w–s |

TABLE D

| d (A) | Intensity |
|---|---|
| 14.7–15.1 | vw |
| 12.2–12.6 | vs |
| 6.1–6.3 | vw–w |
| 4.7–4.9 | vw |
| 4.39–4.49 | vw |
| 3.77–3.87 | vw |
| 3.56–3.66 | vw |
| 3.14–3.20 | vw |
| 2.92–2.98 | vw |
| 2.71–2.75 | vw |
| 2.62–2.66 | vw |
| 2.44–2.48 | vw |
| 2.28–2.32 | vw |

TABLE E

| d (A) | Intensity |
|---|---|
| 19.5–19.9 | vw |
| 9.6–10.0 | vs |
| 4.8–5.0 | m–s |
| 4.45–4.55 | vw |
| 3.78–3.88 | vw |
| 3.56–3.66 | vw–w |
| 3.42–3.48 | vw |
| 3.23–3.29 | w–m |
| 2.77–2.83 | vw |
| 2.42–2.48 | vw–w |

TABLE F

| d (A) | Intensity |
|---|---|
| 6.6–6.8 | w–s |
| 5.8–6.0 | vs |
| 4.6–4.8 | m |
| 4.48–4.59 | vw–m |
| 3.68–3.78 | vw–w |
| 2.96–3.00 | w–m |
| 2.61–2.65 | w–m |

DESCRIPTION OF THE PREFERRED EMBODIMENTS

In particular the present invention relates to crystalline aluminophosphates and related compounds having the chemical composition as described hereinabove, wherein
m = 0.005–0.30
n = 0–0.20
q = 0.40–0.60 and x = 0.40–0.60.

Element X, which can be substituted for aluminum and or phosphorus in the crystalline aluminophosphates and related compounds according to the present invention, can suitably be used one or more of beryllium, magnesium, titanium, manganese, iron, cobalt, zinc, vanadium, nickel, chromium, silicon, lithium, boron, gallium, germanium and arsenic. Typically, said element will be one or more of magnesium, titanium, manganese, iron, cobalt, zinc, nickel, silicon, gallium or germanium, and preferably one or more of magnesium, titanium, manganese, iron, cobalt and silicon.

It should be noted that the expression "1,4-diaminobutane", as used throughout the specification, is meant to include compounds having the basic 1,4-diaminobutane structure of four carbon atoms linearly bridging two nitrogen atoms which nitrogen atoms preferably carry both two hydrogen atoms but which may also carry each up to three lower alkyl groups, preferably methyl groups. In the case of three lower alkyl groups attached to a nitrogen atom a cation is obtained which necessitates the presence of an anion to cause electroneutrality.

In the event that $n > 0$ it will be appreciated that the as-synthesized anhydrous form also contains an appropriate charge-balancing cation such as a proton or a protonated form of R.

An example of a novel crystalline aluminophosphate according to the present invention and belonging to the $AlPO_4$-class has in the as-synthesized form the following chemical composition:

$0.25R(Al_{0.5}P_{0.5})O_2$ having an X-ray diffraction pattern containing at least the lines as given in Table 1.

A further example of a novel crystalline aluminophosphate according to the present invention and belonging to the $AlPO_4$-class has in the as-synthesized form the following chemical composition:

$0.28R(Al_{0.5}P_{0.5})O_2$ having an X-ray diffraction pattern containing at least the lines as given in Table 2.

A further example of a novel crystalline aluminophosphate according to the present invention and belonging to the $AlPO_4$-class has in the as-synthesized form the following chemical composition:

$0.16R(Al_{0.5}P_{0.5})O_2$ having an X-ray diffraction pattern containing at least the lines as given in Table 3.

A further example of a novel crystalline aluminophosphate according to the present invention and belonging to the $AlPO_4$-class has in the as-synthesized form the following chemical composition:

$0.24R(Al_{0.5}P_{0.5})O_2$ having an X-ray diffraction pattern containing at least the lines as given in Table 4.

A further example of a novel crystalline aluminophosphate according to the present invention and belonging to the $AlPO_4$-class has in the as-synthesized form the following composition:

$0.18R(Al_{0.5}P_{0.5})O_2$ having an X-ray diffraction pattern containing at least the lines as given in Table 5.

A further example of a novel crystalline aluminophosphate according to the present invention and belonging to the $AlPO_4$-class has in the as-synthesized form the following composition:

$0.01R(Al_{0.5}P_{0.5})O_2$ having an X-ray diffraction pattern containing at least the lines as given in Table 6.

It should be understood that the anhydrous form referred to in this specification may also contain chemically bound water.

The present invention also relates to novel crystalline aluminophosphates and related compounds having in the calcined substantially R-free form the general chemical composition:

$(X_nAl_qP_x)O_2$, wherein X, n, q and x have the meaning as described hereinabove and wherein $n + q + x = 1$.

The present invention also relates to a process for preparing novel crystalline aluminophosphates as well as related compounds as defined hereinbefore from a forming solution or gel comprising a source of aluminum, a source of phosphorus, 1,4-diaminobutane and optionally a source of at least one component X, which mixture is kept at elevated temperature for a period of time sufficient to produce a crystalline aluminophosphate or related compound followed by separating off the crystalline product obtained and drying, in which solution or gel the various components are initially present in the following molar ratios:

$R:Al_2O_3 = 0.1–3$
$X:Al_2O_3 = 0–2$
$P:Al_2O_3 = 0.3–1.3$
$H_2O:Al_2O_3 = 30–500$.

The crystalline aluminophosphates and related compounds according to the present invention are preferably prepared from a forming solution or gel in which the various components are initially present in the following molar ratios:

$R:Al_2O_3 = 0.15–2$
$X:Al_2O_3 = 0–2$
$P:Al_2O_3 = 0.4–1.25$
$H_2O:Al_2O_3 = 35–320$.

Crystalline aluminophosphates and related compounds having in the as-synthesized anhydrous form an X-ray diffraction pattern containing at least the lines as given in Table A or B are suitably prepared while keeping the temperature below 140° C., in particular at a temperature in the range of from 110° C. to 140° C.

Crystalline aluminophosphates and related compounds having in the as-synthesized anhydrous form an X-ray diffraction pattern containing at least the lines as given in Table A, C or D are suitably prepared while keeping the temperature in the range of from 140° C. to 180° C., in particular at a temperature in the range between 150° C. and 170° C.

Crystalline aluminophosphates and related compounds having in the as-synthesized anhydrous form an X-ray diffraction pattern containing at least the lines as given in Table E or F are suitably prepared while keeping the temperature above 180° C., in particular at a temperature in the range of from 190° C. to 210° C.

The use of aqueous forming solutions or gels is preferred.

The process according to the present invention can be carried out at autogenous pressure as well as at elevated pressure. Normally, the novel crystalline aluminophosphates and related compounds will be produced when the forming solution or gel has been kept under the appropriate conditions for a period of time allowing the proper structure to be formed.

Preferably, the process according to the present invention is carried out for a period of time ranging between 18 and 144 hours, in particular between 24 and 96 hours.

Examples of suitable aluminum sources comprise aluminum oxides, such as gibbsite, boehmite, pseudoboehmite and aluminum alkoxides, such as aluminum isopropoxide and mixtures of various aluminum sources.

It has been found that novel crystalline aluminophosphates having in the as-synthesized anhydrous form an X-ray pattern containing at least the lines as given in Table A are suitably prepared while using aluminum isopropoxide as aluminum source while keeping the temperature below 180° C.

Crystalline aluminophosphates and related compounds having in the as-synthesized anhydrous form an X-ray diffraction pattern containing at least the lines as given in Table B are suitably prepared while using boehmite or pseudo-boehmite as aluminum source while keeping the temperature below 140° C.

Crystalline aluminophosphates and related compounds having in the as-synthesized anhydrous form an X-ray diffraction pattern containing at least the lines as given in Table C are suitably prepared while using aluminum isopropoxide or boehmite as aluminum source while keeping the temperature in the range between 140° C. and 180° C.

Crystalline aluminophosphates and related compounds having in the as-synthesized anhydrous form an X-ray diffraction pattern containing at least the lines as given in Table D are suitably prepared while using pseudo-boehmite as aluminum source while keeping the temperature between 140° C. and 180° C.

Crystalline aluminophosphates and related compounds having in the as-synthesized anhydrous form an X-ray diffraction pattern containing at least the lines as given in Table E or F are suitably prepared while using aluminum isopropoxide, boehmite or pseudo-boehmite as aluminum source while keeping the temperature above 180° C.

Suitable phosphorus sources comprise phosphorus acids and derivatives thereof such as esters, phosphorus oxides, phosphates and phosphites, preferably orthophosphoric acid and mixtures of various phosphorus sources.

Examples of suitable sources of X comprise the appropriate chlorides, iodides, bromides, nitrates, sulfates and acetates, preferably acetates as well as oxides.

If desired, the crystalline aluminophosphates and related compounds produced can be calcined after drying to produce the desired calcined substantially R-free aluminophosphates and related compounds.

It has been found that agitation can be applied advantageously to produce the desired crystalline aluminophosphates and related compounds from the forming solution or gel.

The novel crystalline aluminophosphates and related compounds according to the present invention can suitably be used as molecular sieves, catalysts or as catalyst carriers in the operation of various catalytic processes. If desired, one or more (catalytically) active species, in particular protons and/or precursors thereof and/or one or more metal(s) compounds of Group III and/or the Transition Metals and/or Rare Earth metals and/or precursors thereof, can be incorporated into the crystalline aluminophosphates and related compounds according to the present invention.

They can be incorporated by well-known techniques such as, for instance, impregnation and ion-exchange.

The invention will now be described by means of the following Examples which are intended to be illustrative and are not to be construed as limiting the invention.

EXAMPLE I

A crystalline AlPO$_4$, referred to as SCS-15, was prepared by mixing 27.2 grams of Al(iOPr)$_3$, 15.4 grams of 85% H$_3$PO$_4$, 5.9 grams of 1,4-diaminobutane (C$_4$DN) and 48.1 grams of water giving a reaction gel composition on a molar basis of 1Al$_2$O$_3$:1P$_2$O$_5$:1C$_4$DN:45H$_2$O.

The mixture was kept at 120° C. for a period of 72 hours until a crystalline product was obtained.

After synthesis the crystalline compound produced was separated from the reaction mixture by filtration, water washed and dried at 120° C.

The crystalline compound obtained had in the anhydrous form the following chemical composition:

0.25C$_4$DN(Al$_{0.5}$P$_{0.5}$)O$_2$ and an X-ray diffraction pattern containing at least the lines as given in Table 1 below:

TABLE 1

| d (A) | Intensity |
|---|---|
| 11.2 | vw |
| 9.2 | vs |
| 7.1 | vw |
| 4.8 | vw |
| 4.45 | vw–w |
| 4.25 | vw–w |
| 3.85 | vw–w |
| 3.56 | vw–w |
| 3.49 | vw |
| 3.12 | vw |
| 2.80 | vw |
| 2.78 | vw |

EXAMPLE II

The experiment described in Example I was repeated but maintaining a reaction temperature of 160° C. during the formation of the crystalline AlPO$_4$.

After work up, SCS-15 was obtained having essentially the same lines in its X-ray diffraction pattern as already described in Table 1.

EXAMPLE III

The experiment described in the previous Example was repeated but using a molar ratio C$_4$DN:P$_2$O$_5$ of 1.25.

After work up, SCS-15 was obtained having essentially the same lines in its X-ray diffraction pattern as already described in Table 1.

EXAMPLE IV

The experiment described in Example II was repeated but using a molar ratio H$_2$O:Al$_2$O$_3$ of 320.

After work up, SCS-15 was obtained having essentially the same lines in its X-ray diffraction pattern as already described in Table 1.

EXAMPLE V

The experiment described in Example II was repeated but keeping the reaction mixture at a temperature of 160° C. for a period of 24 hours.

After work up, SCS-15 was obtained having essentially the same lines in its X-ray diffraction pattern as already described in Table 1.

EXAMPLE VI

The experiment as described in Example I was repeated but using 9.2 grams of boehmite as the aluminum source and 45.7 grams of water. A novel AlPO$_4$, referred to as SCS-17, was obtained after the standard work up procedure together with a small amount of SCS-15.

The crystalline product obtained had in the anhydrous form the following molar composition:

0.28C$_4$DN(Al$_{0.5}$P$_{0.5}$)O$_2$ and an X-ray diffraction pattern containing at least the lines as given in Table 2.

TABLE 2

| d (A) | Intensity |
|---|---|
| 12.2 | w-m |
| 11.2 | vs |
| 9.2 | s-vs |
| 4.6 | w |
| 4.46 | w |
| 4.40 | vw-w |
| 3.74 | w |
| 3.55 | w |
| 3.46 | w |

EXAMPLE VII

The experiment described in the previous Example was repeated but using 9.8 grams of pseudo-boehmite as the aluminum source and 45.1 grams of water. After work up, the same compound as described in Example VI was obtained having an X-ray diffraction pattern containing at least the lines given in Table 2.

EXAMPLE VIII

The experiment described in Example II was repeated but using 9.2 grams of boehmite as the aluminum source and 45.7 grams of water. After work up, a crystalline AlPO$_4$, referred to as SCS-18, was obtained.

The crystalline product obtained had in the anhydrous form the following chemical composition:

0.16C$_4$DN(Al$_{0.5}$P$_{0.5}$)O$_2$ and had an X-ray diffraction pattern containing at least the lines as given in Table 3.

TABLE 3

| d (A) | Intensity |
|---|---|
| 9.8 | vs |
| 6.7 | vw-w |
| 4.47 | w-m |
| 3.86 | w-m |
| 3.60 | m-s |
| 3.48 | w-m |
| 2.81 | w-m |

EXAMPLE IX

The experiment described in the previous Example was repeated but using 27.2 grams of Al(iOPr)$_3$ as the aluminum source and 50.4 grams of water as well as using a C$_4$DN:P$_2$O$_5$ molar ratio of 1.67. After working up SCS-18 was obtained having an X-ray diffraction pattern containing at least the lines given in Table 3.

EXAMPLE X

The experiment described in Example VII was repeated but the reaction mixture was kept at a temperature of 160° C. After work up, a crystalline AlPO$_4$, referred to as SCS-19 was obtained together with a small amount of another crystalline AlPO$_4$ material.

The crystalline material obtained had in its anhydrous form the following chemical composition:

0.24C$_4$DN(Al$_{0.5}$P$_{0.5}$)O$_2$ and had an X-ray diffraction pattern containing at least the lines as given in Table 4.

TABLE 4

| d (A) | Intensity |
|---|---|
| 14.9 | vw |
| 12.4 | vs |

TABLE 4-continued

| d (A) | Intensity |
|---|---|
| 6.2 | vw-w |
| 4.8 | vw |
| 4.44 | vw |
| 3.82 | vw |
| 3.61 | vw |
| 3.58 | vw |
| 3.17 | vw |
| 2.99 | vw |
| 2.95 | vw |
| 2.73 | vw |
| 2.64 | vw |
| 2.46 | vw |
| 2.30 | vw |

EXAMPLE XI

The experiment described in Example I was repeated but the reaction mixture was kept at a temperature of 200° C. After work up, a crystalline AlPO$_4$, referred to as SCS-20, was obtained.

The crystalline product obtained had in its anhydrous form the following chemical composition:

0.18C$_4$DN(Al$_{0.5}$P$_{0.5}$)O$_2$ and had an X-ray diffraction pattern containing at least the lines as given in Table 5.

TABLE 5

| d (A) | Intensity |
|---|---|
| 19.7 | vw |
| 9.8 | vs |
| 4.9 | m-s |
| 4.5 | vw |
| 3.83 | vw |
| 3.61 | vw-w |
| 3.45 | vw |
| 3.26 | w-m |
| 2.80 | vw |
| 2.45 | vw-w |

EXAMPLE XII

The experiment described in the previous Example was repeated but using 9.2 grams of boehmite as the aluminum source and 45.7 grams of water. After work up, a crystalline AlPO$_4$, referred to as SCS-21, was obtained.

The crystalline product obtained had in its anhydrous form the following chemical composition:

0.01C$_4$DN(Al$_{0.5}$P$_{0.5}$)O$_2$ and had an X-ray diffraction pattern containing at least the lines as given in Table 6.

TABLE 6

| d (A) | Intensity |
|---|---|
| 6.7 | s |
| 5.9 | vs |
| 4.7 | m |
| 4.55 | w-m |
| 4.18 | w |
| 3.73 | w |
| 3.02 | w-m |
| 2.99 | w-m |
| 2.97 | w-m |
| 2.95 | w |
| 2.83 | w-m |
| 2.66 | w-m |
| 2.63 | w-m |

EXAMPLE XIII

The experiment described in the previous Example was repeated but using pseudo-boehmite as the aluminum source. After work up, SCS-21 was obtained together with a very small amount of an unknown material. The crystalline material obtained had an X-ray diffraction pattern containing at least the lines as given in Table 6.

We claim:

1. A crystalline aluminophosphate composition having in an as-synthesized form the chemical composition $mR(Al_qP_x)O_2$, wherein R represents 1,4-diaminobutane, wherein
   $m = 0-0.33$
   $q = 0.30-0.60$
   $x = 0.30-0.60$
   and wherein $q + x = 1$ and having an X-ray diffraction pattern containing at least the lines as given in Table B:

TABLE B

| d (Å) | Intensity |
|---|---|
| 12.0–12.4 | w-m |
| 10.9–11.4 | s-vs |
| 9.0–9.4 | s-vs |
| 4.4–4.6 | w |
| 4.41–4.51 | w |
| 3.69–3.79 | w |
| 3.52–3.58 | w |
| 3.43–3.50 | w |

2. A crystalline aluminophosphate composition having in an as-synthesized form the chemical composition $mR(Al_qP_x)O_2$, wherein R represents 1,4-diaminobutane, wherein
   $m = 0-0.33$
   $q = 0.30-0.60$
   $x = 0.30-0.60$
   and wherein $q + x = 1$ and having an X-ray diffraction pattern containing at least the lines as given in Table E:

TABLE E

| d (Å) | Intensity |
|---|---|
| 19.5–19.9 | vw |
| 9.6–10.0 | vs |
| 4.8–5.0 | m-s |
| 4.45–4.55 | vw |
| 3.78–3.88 | vw |
| 3.56–3.66 | vw-w |
| 3.42–3.48 | vw |
| 3.23–3.29 | w-m |
| 2.77–2.83 | vw |
| 2.42–2.48 | vw-w |

3. The crystalline aluminophosphate composition of claim 1 or 2 wherein
   $m = 0.005-0.30$
   $q = 0.40-0.60$
   $x = 0.40-0.60$.

4. The crystalline aluminophosphate according to claim 1 having an X-ray pattern containing at least the lines as given in Table 2:

TABLE 2

| d (A) | Intensity |
|---|---|
| 12.2 | w-m |
| 11.2 | vs |
| 9.2 | s-vs |
| 4.6 | w |
| 4.46 | w |
| 4.40 | vw-w |
| 3.74 | w |
| 3.55 | w |
| 3.46 | w |

5. The crystalline aluminophosphate according to claim 2 having an X-ray pattern containing at least the lines as given in Table 5:

TABLE 5

| d (A) | Intensity |
|---|---|
| 19.7 | vw |
| 9.8 | vs |
| 4.9 | m-s |
| 4.5 | vw |
| 3.83 | vw |
| 3.61 | vw-w |
| 3.45 | vw |
| 3.26 | w-m |
| 2.80 | vw |
| 2.45 | vw-w |

* * * * *